United States Patent [19]

Nachtigal et al.

[11] 3,836,757

[45] Sept. 17, 1974

[54] METHOD AND APPARATUS FOR THE COMPUTATION OF DYNAMIC PROPERTIES

[75] Inventors: Chester L. Nachtigal; Benny M. Hillberry; Raymond E. Goodson, all of West Lafayette, Ind.

[73] Assignee: GLN Inc., Lafayette, Ind.

[22] Filed: May 22, 1973

[21] Appl. No.: 363,180

Related U.S. Application Data

[63] Continuation-in-part of Ser. No. 231,557, March 3, 1972, abandoned.

[52] U.S. Cl................ 235/151.3, 73/67.1, 73/89, 73/95
[51] Int. Cl............................................. G06g 7/32
[58] Field of Search................ 235/151.3, 151.32; 73/67.1, 89, 94, 95

[56] References Cited
UNITED STATES PATENTS

| | | | |
|---|---|---|---|
| 3,030,803 | 4/1962 | Painter | 235/151.3 X |
| 3,191,431 | 6/1965 | Schloss | 73/67.1 |
| 3,379,054 | 4/1968 | Folweiler | 73/95 |
| 3,447,363 | 6/1969 | Goldfinger | 73/95 |
| 3,554,019 | 1/1971 | Van Den Hove et al. | 73/89 |
| 3,558,866 | 1/1971 | Paulson | 235/151.3 |
| 3,733,049 | 5/1973 | Van Den Hove et al. | 235/151.3 |

*Primary Examiner*—Malcolm A. Morrison
*Assistant Examiner*—Jerry Smith
*Attorney, Agent, or Firm*—Trask, Jenkins & Hanley

[57] ABSTRACT

A method and apparatus for computing the dynamic properties of a material or substance. A transducer is used to generate an electrical signal which is representative of an excitation that is dynamically applied to the material, and a second transducer is used to generate an electrical signal which is representative of the response of the material to such excitation. Independent compensation circuits operate on the generated excitation signal and the generated response signal to compensate for any dynamic errors which are introduced into the phase and/or magnitude ratio existing between the signals by the transducing instruments. A pair of generating circuits, whose characteristics are identically and dynamically matched over the frequency range of interest, accept the compensated excitation signal and the compensated response signal, respectively, and operate thereon. The outputs of one of these matched generating circuits is a first generated signal which is closely related to the compensated response signal and a second generated signal which represents the exact time derivative of the first generated signal, i.e., the related response signal. The output of the second matched generating circuit is a third generated signal which is closely related to the compensated excitation signal. These matched generating circuits preserve the gain and phase relationships which exist between the applied excitation and the actual resultant response.

13 Claims, 8 Drawing Figures 3,836,757

METHOD AND APPARATUS FOR THE COMPUTATION OF DYNAMIC PROPERTIES

This is a continuation-in-part of our co-pending application Ser. No. 231,557, filed Mar. 3, 1972 and now abandoned.

BACKGROUND OF THE INVENTION

This invention relates to an automatic method and apparatus for computing the dynamic properties of materials or substances.

The problem of effectively calculating or otherwise obtaining the dynamic characteristics of materials or substances is particularly well known in the automotive field where the dynamic properties of materials such as the rubber used in engine and body mounts must be precisely determined. These mounts must be constructed from a material having the proper dynamic damping and spring properties and in an acceptable configuration to efficiently isolate and control engine and road vibrations.

The dynamic properties of the mounts and mount material are conventionally measured using a resonant-beam or an electrohydraulic machine. In the former, a specimen of the material or a sample of the mount is placed between a beam and a rigid support, and an exciting force, usually sinusoidal in nature, is applied to the end of the beam. The frequency and amplitude of the force are adjusted manually until the beam and the specimen are vibrating in mechanical resonance at a predetermined amplitude. The applied force is usually measured at the end of the beam, while the resulting dynamic deflection or the velocity of the deflection is measured at some intermediate point on the beam. The spring constant and the damping characteristic of the specimen or sample must then be arrived at through manual computation using the measured values for the force and deflection or velocity, and the frequency of the force and taking into account the predetermined properties of the particular testing machine.

The electrohydraulic machine utilizes an electrohydraulic valve actuator to apply a predetermined oscillatory force at an automatically maintained amplitude and frequency. The force and velocity of deflection or the force and the deflection are then measured across the sample, and the spring constant and damping characteristics ascertained by manually adjusting a plurality of potentiometers.

Error can be introduced into the resonant beam technique if there is any compliance or damping in the specimen mounting plate, in the pivot for the beam, or in the beam itself. The electrohydraulic machine does not necessarily introduce errors of this kind, but is much more expensive than the resonant beam machine and does not enjoy wide spread use. In both machines a great deal of error is introduced into the final determination of the spring constant and damping characteristics by small electrical phase shifts injected in the measured values by the transducers used to measure the force and those used to measure the velocity or deflection. In addition, manual adjustments of potentiometers are conventionally used to correct for these errors, but the phase corrections provided thereby are not satisfactory for the stringent phase shift control required to obtain accurate results. Secondly, the required manual adjustments and computations make these methods depend upon the skill of the person performing them.

It is, therefore, highly desirable to provide an automatic method and apparatus for the identification of the dynamic properties of materials which can be used with conventional testing equipment, such as a resonant-beam machine or an electrohydraulic machine in the instance where rubber or another elastomer is being tested, and which provides stringent phase shift control and automatic computation of the dynamic properties with little or no human intervention.

SUMMARY OF THE INVENTION

In accordance with the invention, we provide an automatic apparatus and method for computing the dynamic properties of a material or substance when such material or substance is excited by a measurable excitation and responds with some measurable response or rate of response. The excitation and response or rate of response are qualified only by the requirement that they be measurable, and that such measurement be transferable into proportional electrical signals by an appropriate transducer. A mathematical model is assumed for the material or substance under analysis. The coefficients of the terms in the mathematical model provide the correspondence between a particular excitation and a particular response or rate of response thereby characterizing the dynamic properties of the material or substance. The measured excitation and measured response or rate of response values are used to compute these coefficients.

An appropriate error criterion is chosen and used to develop relationships which are utilized during the final coefficient or parameter computation to force any equation error which may result from the assumed mathematical model asymptotically to zero. The computed parameters can then be displayed in Engineering units, if desired.

The invention has been found to be extremely beneficial in the computation of the dynamic properties of a material such as rubber or other elastomers. Materials such as these can be characterized to a reasonable degree of accuracy by using a linear model to represent the dynamic behavior of the material when subjected to an excitation in the form of an applied force. The use of a linear model consists, in essence, of utilizing a mechanical analogy wherein the material is represented by a parallel combination of a linear spring having a dynamic spring rate, K, and a viscous dash pot having a damping coefficient, C. In this case, the applied force is equal to the product of the damping coefficient, C, and the velocity of the resulting deflection added to the product of the dynamic spring rate K and the amount of such deflection.

In a preferred embodiment, the applied force and the material deflection or the velocity of deflection resulting from that force are measured with transducers which generate signals proportional to the force and the deflection or velocity of deflection. The deflection or velocity signal is used to generate two new signals. If the velocity of deflection is measured, a new velocity signal as well as a deflection signal is generated. The same new signals are generated in the event that the deflection is measured, i.e., a new deflection signal and a velocity signal. These two signals are used in the subsequent computation.

The relationship between the generated deflection signal and the generated velocity signal is maintained at precisely that of exact differentiation over the frequency and amplitude range of the device. The circuit used for the generation of these two signals is dynamically and precisely matched with another circuit to which the force signal is applied and from which a new force signal is obtained. The new force signal, the new deflection signal and the velocity signal, or, in the alternative, the new force signal, the new velocity signal and the deflection signal have, by reason of this precise circuit matching, the exact same gain and phase relationship as that which existed between the actual force, deflection and velocity. The maintenance of this relationship is important for accurate computation of K and C. A separate circuit and method are provided for obtaining the requisite precise dynamic matching of these circuits.

The generated signals representing the force, the deflection and the velocity of deflection can be used to compute the characterizing damping constant, C, and the spring coefficient, K. Any error introduced into the linear model by non-linearities is minimized by optimizing the values of K and C which are obtained over the full range of frequencies and amplitudes. In the preferred embodiment, K and C are computed using the method of steepest descent wherein the relationships established by squaring the equation error, which is equal to the force minus the product of the spring rate constant and the deflection minus the product of the damping coefficient and the velocity, are used to generate approximate values for K and C. These approximate values are then fed back and compared with the values being generated and any differences found therein acted upon to generate new values of K and C until the error has been driven asymptotically to zero. The values of K and C can then be displayed, after proper scaling, in engineering units on a digital voltmeter or other suitable display device.

BRIEF DESCRIPTION OF THE DRAWINGS

The accompanying drawings illustrate the invention, and, by way of example, show a preferred specific embodiment of the invention. In such drawings.

DETAILED DESCRIPTION OF THE PREFERRED EMBODIMENT

Figure 1:
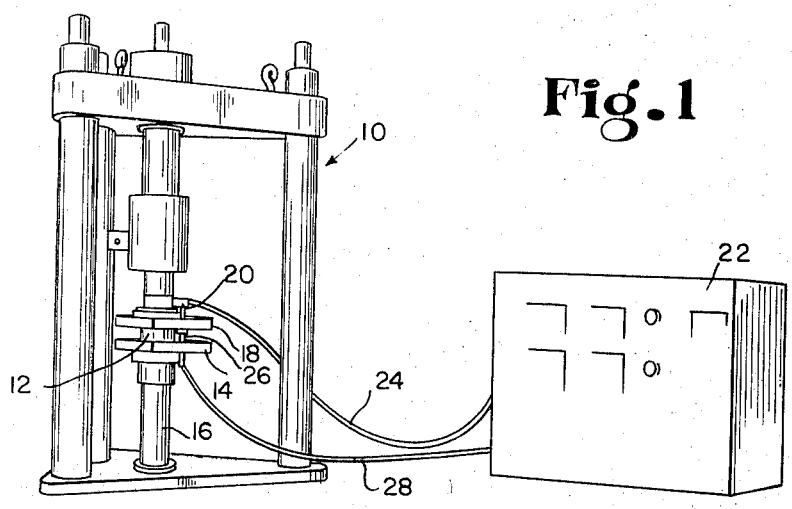
FIG. 1 is a side elevational view showing an electrohydraulic actuating machine as used with the invention.

The apparatus and circuitry shown in the accompanying drawings is for the identification and determination of the dynamic parameters of a material or substance. The particular material or substance is unimportant with the only criteria for use with the inventive apparatus being that it exhibit a measurable response or a measurable rate of response to a measurable excitation and the measurements be convertible into electrical signals.

Although the preferred embodiment will be described in detail using a sample of rubber as the material under analysis, it will be understood that any material or substance could be analyzed in the manner described. For example, a measured amount of light could be used as the excitation for a photo sensitive substance and the change in the resistivity of that substance due to the light could be measured. The rate at which the resistive change took place could be generated and parameters of the substance computed which characterize its sensitivity to light.

Rubber is acceptably represented as a linear material which, when subjected to a force, is characterized by a linear spring and a damping element in parallel. Optimal identification of the value of the dynamic spring constant (K) and the value of damping constant (C) has been found to provide a good characterization of the material.

The system shown in the accompanying drawings is for determining and optimizing the values of K and C of a sample or specimen of rubber. The force applied across the rubber sample by an electrohydraulic actuator is measured by strain gages connected in a balanced four-armed bridge wherein any imbalance caused by a force is used to generate a representative electrical signal. In a similar manner, the deflection of the sample due to the applied force is measured by a Linear Variable Displacement Transformer (LVDT) wherein the electrical output from the LVDT is representative of the amount of such deflection. Preferably, the applied force is periodic in nature to provide longer integration times for the optimization technique which will be described, so that several cycles of the oscillatory force can be used to optimize the K and C parameters or, in other words, force any equation error to zero.

The resulting force signal and the resulting deflection signal are independently compensated in separate compensation circuits so that the force signal bears the same relationship to the deflection signal as the applied mechanical force did to the physical deflection of the sample. The compensating circuits of the preferred embodiment perform this independent compensation by eliminating any phase shift between the applied force and the generated force signal and likewise between the actual sample deflection signal. This initial phase correction or compensation is needed because of the phase shift imposed on these two signals by the strain gages and the LVDT, respectively. In general, the force signal is not in phase with the deflection signal, but the phase relationship existing between the applied mechanical force and the physical deflection must be precisely maintained throughout the computations, because the damping coefficient (C) is a strong function of any phase difference between the two signals.

The assumed relationship between the applied force F, the physical deflection D, and the velocity of the physical deflection $V_D$ is $F = KD + CV_D$. In general, it is very difficult to measure both D and $V_D$ with sufficient accuracy to ensure accurate computation of K and C. It is also very difficult to differentiate D exactly to obtain the signal $V_D$, but it has been found possible to obtain the exact derivative of a signal, D', which is closely related to the physical deflection. The circuit used to convert the deflection signal D to the new deflection signal D' is also used to extract the exact derivative, $V_D'$, of D'. The precise, dynamic relationship between D' and $V_D'$ is identical to the dynamic relationship between D and $V_D$. Likewise, the force signal F is similarly passed through a circuit which has been dynamically matched with the above circuit used to convert D to D' to generate a new force signal F'. The dynamic matching of two circuits ensures that the gain and/or phase shifts between D and D', $V_D$ and $V_D'$, and F and F' will all be identical.

The new deflection signal, D', the new force signal, F', and the generated deflection velocity signal $V_D'$ are then used to compute the dynamic spring constant, K, and the damping coefficient, C, by means of a steepest descent technique.

The amount of force required for an extremely compliant soft rubber sample is very small with respect to the amount of resulting deflection. A ranging gain can be manually selected to amplify or increase the force signal for greater accuracy in the K and C computation. The resulting values for K and C, as well as the placement of the decimal point in their displayed values, are simultaneously scaled to align the K and C values with the particular force range selected.

More specifically, and with reference to the drawings, FIG. 1 shows an electrohydraulic actuator 10 which is used for applying a periodically varying force to a specimen 12 of a material such as rubber. The specimen 12 is mounted on a rigid plate 14 which is fixed to the top of an electrohydraulically actuated piston 16. The piston 16 and plate 14 is raised to a vertical position where the specimen 12 comes in contact with a rigid plate 18 fixed to the lower end of a fixed frame member 19. The control system (not shown) for the electrically controlled hydraulic piston causes a periodically varying force to be applied to the rubber specimen 12 through the mounting plate 14 and piston 16, which is measured by a load cell 20 and which generates an electrical signal proportional to such force. The electrical signal is transmitted to a computation module 22 by means of a conductor 24.

The deflection of the rubber specimen 12, in response to the force applied by the piston 16, is measured by means of a Linear Variable Differential Transformer (LVDT) 26 which is mounted between the force applying plates 14 and 18 and which transmits an electrical signal proportional to such deflection to the control module 22 by means of a second conductor 28. The deflection is measured across the rubber sample to eliminate any error due to a minor deflection or compliance of the upper actuating plate 18. Alternatively, the LVDT can be replaced by a linear velocity transducer to generate a signal indicative of the velocity of the deflection. It should be understood that, even though the deflection signal will be used in describing the preferred embodiment, the use of the velocity of deflection as a measured value from which a representative deflection signal is generated is within the scope of the invention.

Figure 2:
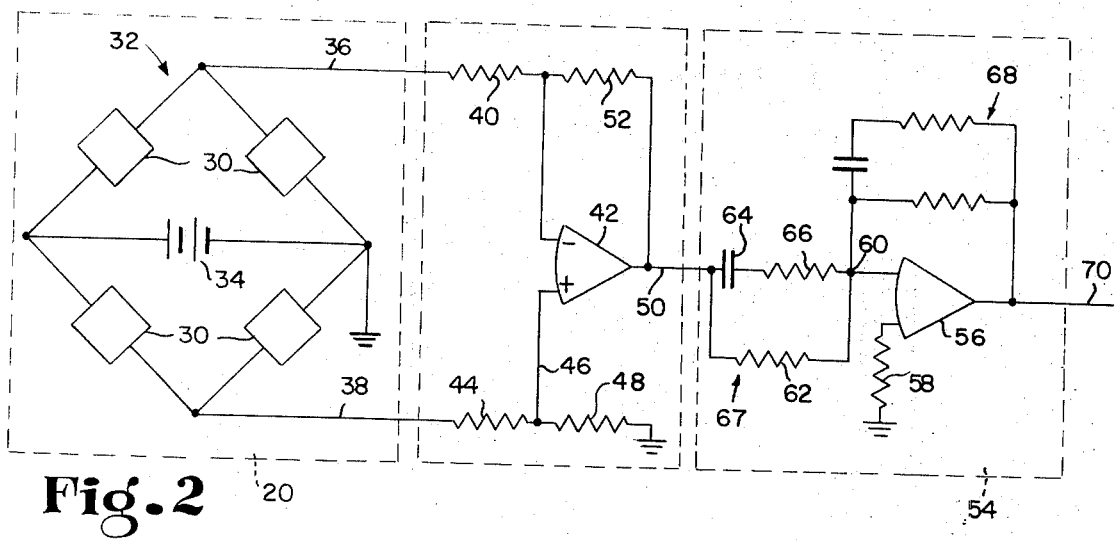
FIG. 2 is an electrical circuit diagram showing a circuit embodied in the invention used for force measurement.

The circuitry contained in the calculation module 22, as well as the display means for the calculated values of K and C, is shown in FIGS. 2 through 6 and FIG. 8. With reference to FIG. 2, the load cell 20 for measuring the applied force comprises four strain gages 30 which are connected together in a balanced bridge circuit 32. Reference voltage for this bridge is supplied from a B+ voltage supply 34 which is connected across the bridge. The electrical resistance of each of the strain gages is altered by the applied force to cause an imbalance in the bridge which creates a voltage differential between the two bridge output conductors 36 and 38. The difference in the voltages on these two conductors 36 and 38 represents the load or force applied to the rubber specimen 12.

The voltage on the top output conductors 36 is applied through an input resistor 40 to the inverting input of an operational amplifier 42 while the bottom bridge output conductor 38 is applied through an input resistor 44 to the non-inverting input of the same operational amplifier 42. The non-inverting input 46 is also connected to ground through a resistor 48. The output conductor 50 of this operational amplifier 42 has a voltage thereon which is equal to the difference between the voltages on the bridge output conductors 36 and 38 amplified by an amount determined by the ratio of a feedback resistor 52 to the inverting input resistor 40.

As was previously mentioned, it is necessary to eliminate any phase shift between the applied force and the signal voltage which is representative of that force and which is created by the strain gage bridge. The output conductor 50 of the differential amplifier 42 is used as the input conductor to a compensation circuit 54. The circuit 54 is comprised of an operational amplifier 56 which has its non-inverting input connected to ground through a resistor 58. The input conductor 50 is connected to the inverting summing junction 60 of the operational amplifier 56 through a parallel circuit 67 formed by a resistor 62 and a series connection of a capacitor 64 and a resistor 66. The particular values of capacitance and resistance needed in the input circuit 67 and in a similar feedback circuit 68 for the amplifier 56 are determined by the amount of phase shift imposed in the force signal by the particular strain gage transducers used. The output of the compensation network 54 is the negative of the input due to its application to the inverting summing junction 60, and is in phase with the applied force and is present on an output conductor 70.

The determination of the K and C parameters requires that the force be measured and either the amount of deflection due to that force be measured or the velocity of deflection due to the force be measured. It has been found somewhat difficult to measure the velocity of the deflection due to the difficulty incurred in the necessary calibration of a velocity transducer. For accuracy and ease of operation, the deflection is measured and the velocity of deflection calculated. However, it is to be understood that the velocity can be measured where feasible and the deflection calculated from the measured quantity.

Figure 3:
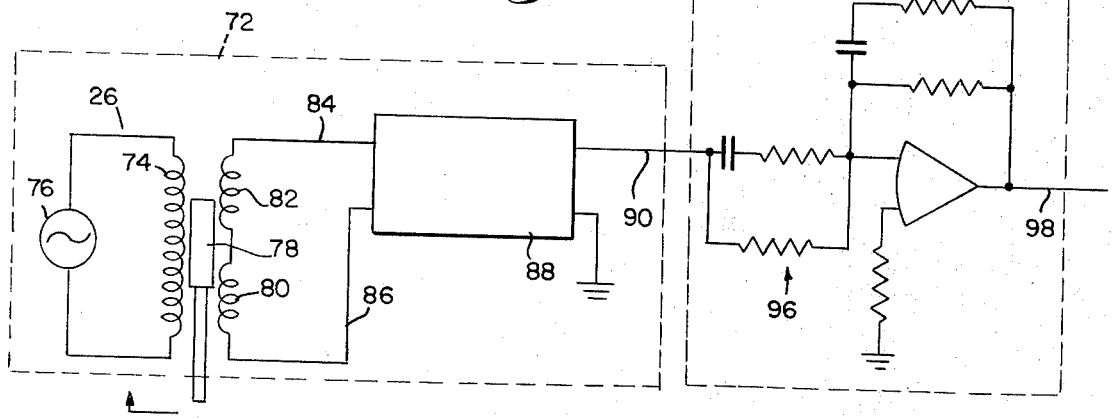
FIG. 3 is an electrical circuit diagram showing a circuit embodied in the invention for deflection measurement.

A Linear Variable Differential Transformer (LVDT) and associated circuitry is shown in FIG. 3 for the measurement of the deflection of the rubber sample under the applied force. The primary winding 74 of the LVDT is connected to an alternating current source 76. A central movable member 78 is positioned between the forcing plates 14 and 18 on the electrohydraulic actuator 10 so that it is moved in and out between the primary coil 74 and a pair of secondary coils 80 and 82 as the rubber sample 12 deflects under the applied force. This movement of the central member 78 causes a voltage differential to be applied between the two output conductors 84 and 86 of the secondary coils 82 and 80. This voltage differential is demodulated and amplified in a conventional demodulator and amplifier 88 and applied to an output conductor 90. The LVDT, like the strain gages for measuring the applied force, causes a slight phase shift between the signal generated and the actual physical deflection. This phase shift is compensated for in a compensation network 92 to which the output conductor 90 is coupled. The configuration for this compensation network 92 is identical to that used for compensating the force signal. However, the particular capacitor and resistor values in the feedback network 94 and in the input network 96 are dictated by the phase shift injected by the particular LVDT in use. The signal on an output conductor 98 from the deflection signal phase compensation network 92 represents the amount of deflection the rubber sample 12 is undergoing, is in phase with that deflection and is the negative of the input to the compensation circuit 54.

At any given instant of time, the signal on the output conductor 70 from the force signal compensation network 54 bears the same relationship to the signal present on the output conductor 98 from the deflection signal compensation network 92, as the applied force had with the actual deflection existing across the rubber sample. For example, if the compensated force signal can be made to be in phase with the applied force, the non-compensated deflection signal would be in phase with the actual physical deflection. Alternatively, if the compensated force signal is displaced in phase by a certain amount from the applied force, the compensated deflection signal would be displaced in phase from the actual deflection by the exact same amount. Stated in a different manner, the phase relationship between the two pair of signals is always preserved.

Depending on the stiffness or compliance of the rubber sample under analysis, the force signal, F, may be very small compared to the deflection signal, D. The phase compensated force signal, F, is coupled by the output conductor 70 to a range selection network 100 shown in FIG. 4, and is applied to the common junction 102 of one wafer 103 of a single ganged wafer rotary switch 104. Each of the terminals 106 through 109 on this wafer 103 are coupled through a different valued resistance, 110 through 113, to the summing junction 114 of the inverting input for an operational amplifier 116. The non-inverting input of this amplifier 116 is coupled to ground through a resistor 118. The amount which the incoming signal, −F, is amplified depends upon the terminal 106 through 109 to which the common point 102 is connected by the rotary switch contact 120 and is equal to the value of an amplifier feedback resistor 122 divided by the value of the particular input resistor, 110 through 113, which is used. The remaining wafers 126 through 128 of this rotary switch 104 are used to correspondingly scale down the calculated values of K, C and the decimal point placement, respectively, to bring them into accord with any initial amplification of the force signal.

As previously mentioned, the controlling relationship which relates the actual deflection, velocity and force together is $F = KD + CV_D$. Signals representative of D, F, and $V_D$ are needed simultaneously in order to calculate the K and C parameters. An electrical signal representing −D is available on the output conductor 98 from the deflection signal phase compensation network 92. An electrical signal corresponding to the applied force is available on the output conductor 124 from the force scaling circuit shown in FIG. 4. A signal corresponding to the velocity of deflection must be generated. In general, however, the generation of a first time derivative of the deflection signal, which is the mathematical expression for the velocity of that deflection, is impossible without an extreme noise problem which results in inaccuracies, or without an accompanying signal phase shift which also causes inaccuracies. It should also be recognized and kept in mind that due to imperfect circuit components, passing any signal through any circuit alters the amplitude and phase characteristics of the signal somewhat.

The signal generating circuit 130 is comprised of two circuits 132 and 134 which are identical in configuration, and as will hereinafter be explained, identical in dynamic properties. One of these circuits 132 is used to generate the representative deflection velocity signal, $V_D'$, and a new deflection signal, D′, while the other 134 is used to generate a new force signal, F′.

The output conductor 98 from the deflection signal phase compensation network 92 is coupled through an input capacitor 136 and a resistor 138 to the summing junction 140 of an operational amplifier 142 in the generation circuit 132 for $V_D'$ and D′. The capacitor 136 blocks or eliminates all erroneous D.C. levels contained in the incoming deflection signal, D. The non-inverting input of this amplifier 142 is coupled to ground through a resistor 144. A third resistor 146 is used as the input resistor to the inverting summing junction 140 for a feedback signal D′, comprising the new deflection signal, which is the output from an inverting amplifier 148 forming the last stage of the overall circuit 132. D′ is proportional to the original deflection signal, D, but includes the gain and phase variations created in D by the generation of $V_D'$.

The feedback circuit for the operational amplifier 142 comprises a parallel combination of a capacitor 150 and a resistor 152. The capacitor 150 is used to eliminate any high frequency electronic noise components contained in the signal.

The common summing junction connection of the feedback signal D′ with the incoming negative of the deflection signal, −D, results in the time derivative signal, i.e., $V_D'$, being made available at the output of the amplifier 142 with the concurrent elimination of the electronic noise and erroneous D.C. signals. The velocity signal, $V_D'$, is integrated by an integrator 154, the output of which is the negative of the new deflection signal, i.e., −D′. This signal is inverted by the inverting amplifier 148 to form the signal D′ which is then fed back, as explained above, to the first stage summing junction 140.

The generation of the velocity signal $V_D'$ and the new deflection signal, D′, is accompanied by a phase and amplitude shift from the original deflection signal, D. The force signal, F, must be shifted in phase and amplitude by exactly the same amounts to generate a new force signal F' so that the calculations of K and C will be conducted using force, deflection and velocity signals which bear precisely the same phase and amplitude relationship to each other as the original force and deflection signals did. In this regard, it should be noted that C is particularly dependent on the phase relationship between the signals so any shift would give rise to large inaccuracies in its calculation.

Figure 4:
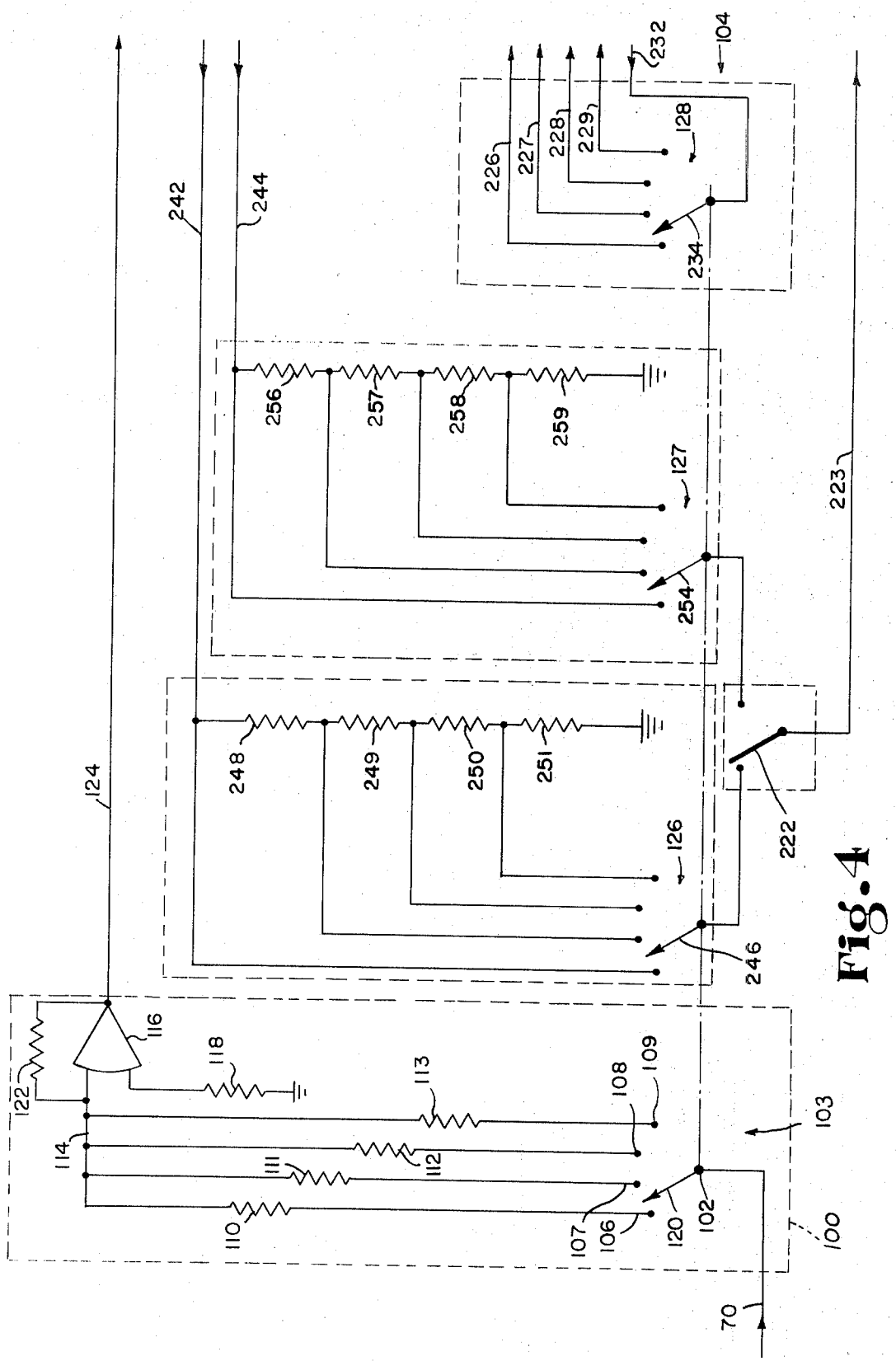
FIG. 4 is an electrical circuit diagram showing a scaling circuit embodied in the invention.

The output conductor 124 of the F scaling circuit shown in FIG. 4 is coupled to the input of the second 134 of the two circuits 132 and 134 having identical configurations and dynamic properties. The operation of this circuit 134 is identical to that described for the generation of the velocity signal $V_D'$ and the new deflection signal D'. The new force signal F' is taken from the output of the integrator 155 in this circuit 134 for use with $V_D'$ and D' in the calculation of K and C.

Figure 6:
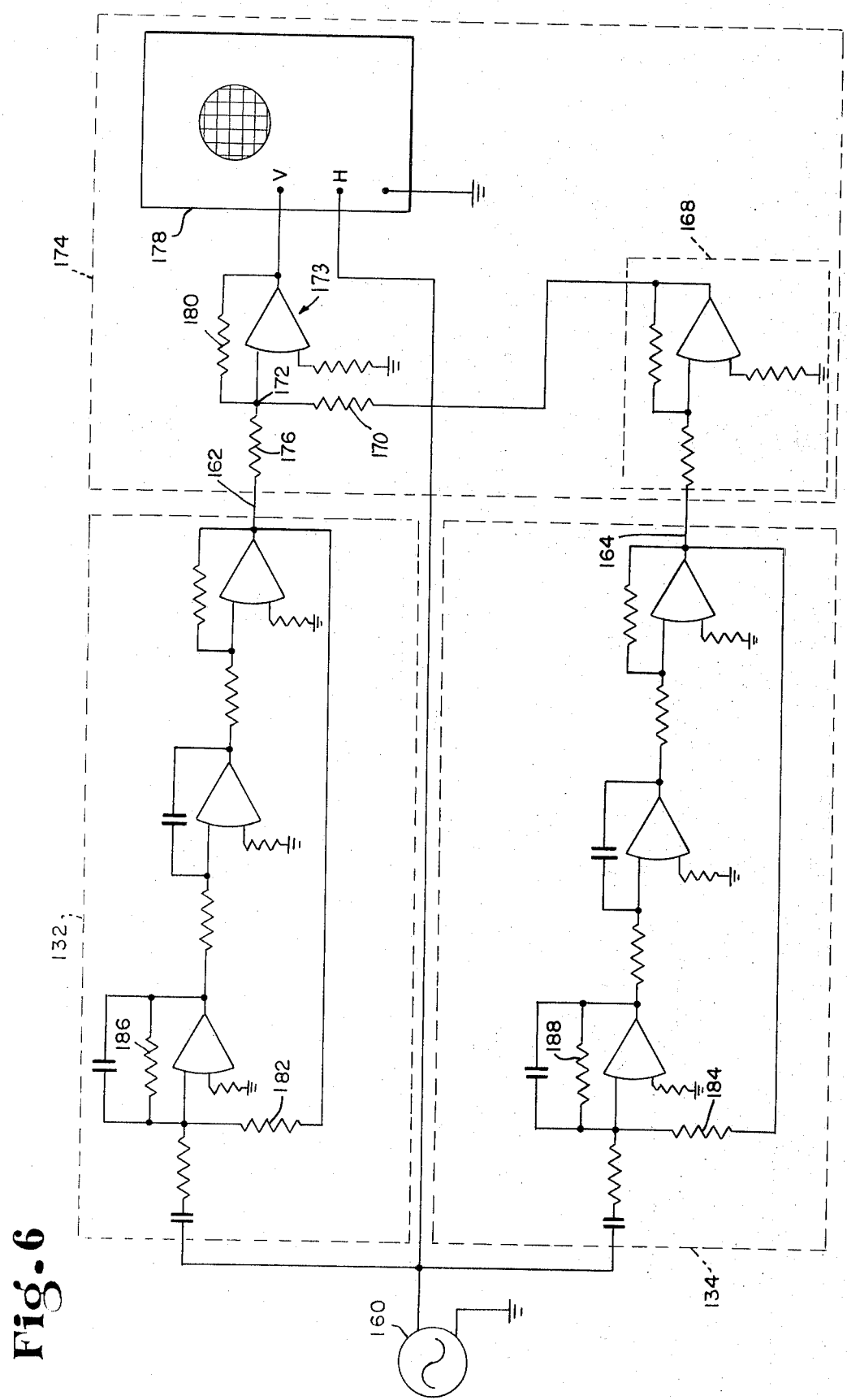
FIG. 6 is an electrical circuit diagram showing a circuit matching network and apparatus embodied in the invention.
Figure 7:
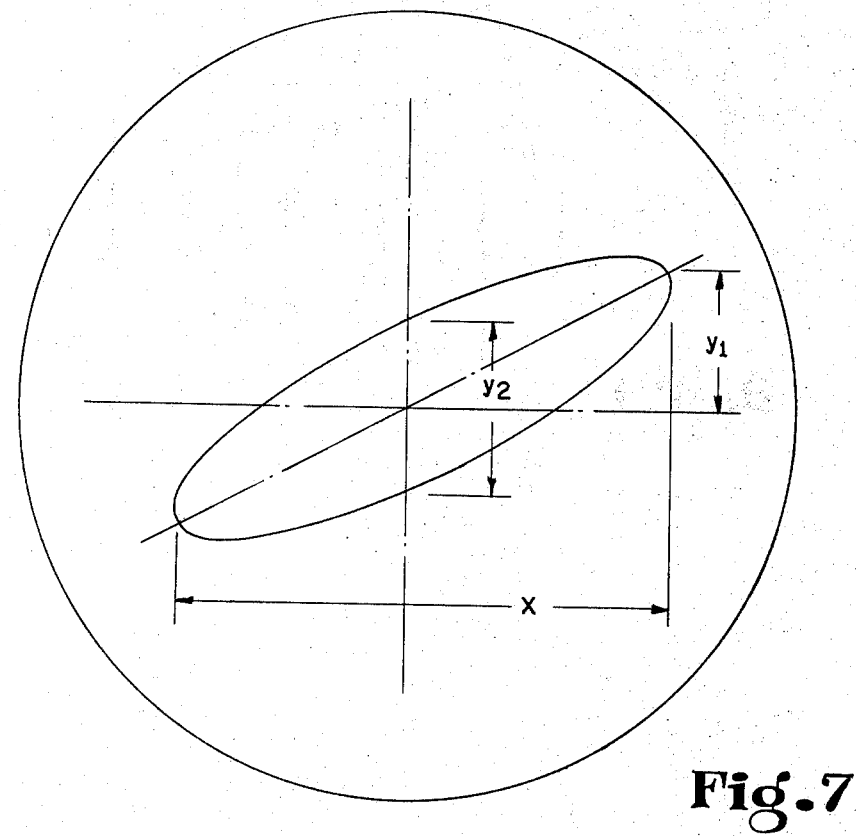
FIG. 7 shows a sample Lissajous pattern generated by the circuit of FIG. 6.

With reference to FIG. 6 and FIG. 7, the inventors provide a circuit and method for performing the precise matching of the phase shift and gain of the velocity and new deflection generating circuit 132 with that of the new force generating circuit 134 so that while the characteristics of the signals may be varied, they are varied by exactly the same amount and in the same way. This matching is preferably performed on these circuits 132 and 134 prior to connecting them into the overall circuit.

The output of a variable frequency oscillator 160 is used as the input to both the velocity and deflection circuit 132 and the force circuit 134. The two output conductors 162 and 164 for these two circuits 132 and 134 are used as the inputs for a matching circuit 174. The output conductor 164 of the force circuit 134 has its signal inverted by an inverting amplifier 168 before it is applied through an input resistor 170 to the summing junction 172 of a summing amplifier 173. The output conductor 162 of the velocity and deflection circuit 132 is also coupled to the same summing junction 172 through an input resistor 176. The output of the summing amplifier 173 represents the difference between the two input signals and is displayed on the vertical channel of a cathode ray oscilloscope 178. The output from the variable frequency oscillator 160 is displayed on the horizontal channel of this same oscilloscope 178. Relatively large gain can be applied to the difference signal by making the feedback resistor 180 for the summing amplifier 173 quite large with respect to the input resistors 170 and 176 which must be equal to each other.

Assuming an initial inequality between the two circuits 132 and 134, a Lissajous pattern will be displayed on the screen of the oscilloscope. An example of this display is shown in FIG. 7. The inclination of the major axis of the Lissajous pattern is represented by the quantity $Y_1$ and is due, or proportional to, the overall gain difference between the two circuits 132 and 134. The distance, $Y_2$, between the points where the Lissajous pattern crosses the ordinate axis is related to the difference in overall phase shift imparted to the input signal by the two circuits 132 and 134.

Equality of the gain characteristics of the two circuits 132 and 134 is achieved by varying the value of the input resistors 182 and 184 for the feedback signal in each circuit so that the distance $Y_1$ goes to zero or, in other words, until the major axis of the Lissajous pattern is on the abscissa axis.

The difference in overall phase shift between the two circuits 132 and 134 is next adjusted to zero by varying the first stage feedback resistor 186 of the first circuit 132 with respect to the corresponding feedback resistor 188 in the second circuit 134 until the $Y_2$ distance on the Lissajous pattern is reduced to zero.

Again with reference to FIG. 5, it is seen that the signals $-V_D'$ (obtained by passing $V_D$ through an inverter 192) $V_D'$, $-D'$, D' and F' are available from the generation circuit 130 for use in calculating the C and K parameters. It is important to note that the prime on the force, deflection, and velocity signals indicates that the signals have been varied somewhat from those actually occurring by their passage through the generation circuit 130, but the phase and amplitude relationships between them has been maintained as a result of the precise dynamic matching of the two circuits 132 and 134.

The technique used for calculating K and C is known as the method of steepest descent. In mathematical terms, as previously mentioned several times, the controlling relationship between the force, the deflection and the velocity of deflection is $F = KD + CV_D$. However, all of the quantities have been altered somewhat, by exactly the same amount, due to their passage through the generation circuit 130 so that an equally valid expression is $F' = KD' + CV_D'$. This equation, as also previously mentioned, is the equation of the assumed linear dynamic model for the rubber sample and does not take into account the non-linear characteristics which may be present in the rubber. Due to these non-linearities, there is some error introduced into the general equation which is now more correctly set forth as $F' - KD' - CV_D' = E$, where E is the amount of equation error.

The method of steepest descent uses relationships obtained by squaring both sides of the latter equation and substituting in progressive values for K and C until the error term, which is now $E^2$, is driven as closely to zero as possible. The squaring of both sides of the equation is performed so that the error term will always be positive in sign and will always have a negative change with respect to time as such error term is driven toward zero.

The mathematical expressions which are derived from the squared general expression using K and C, i.e., $(F' - KD' - CV_D') = E^2$, and which identify their change with respect to time to establish the steepest slope of the error toward zero are as follows:

$$dK/dt = (F' - KD' - CV_D') D'$$

and $$dC/dt = (F' - KD' - CV_D') V_D'$$

Figure 5:
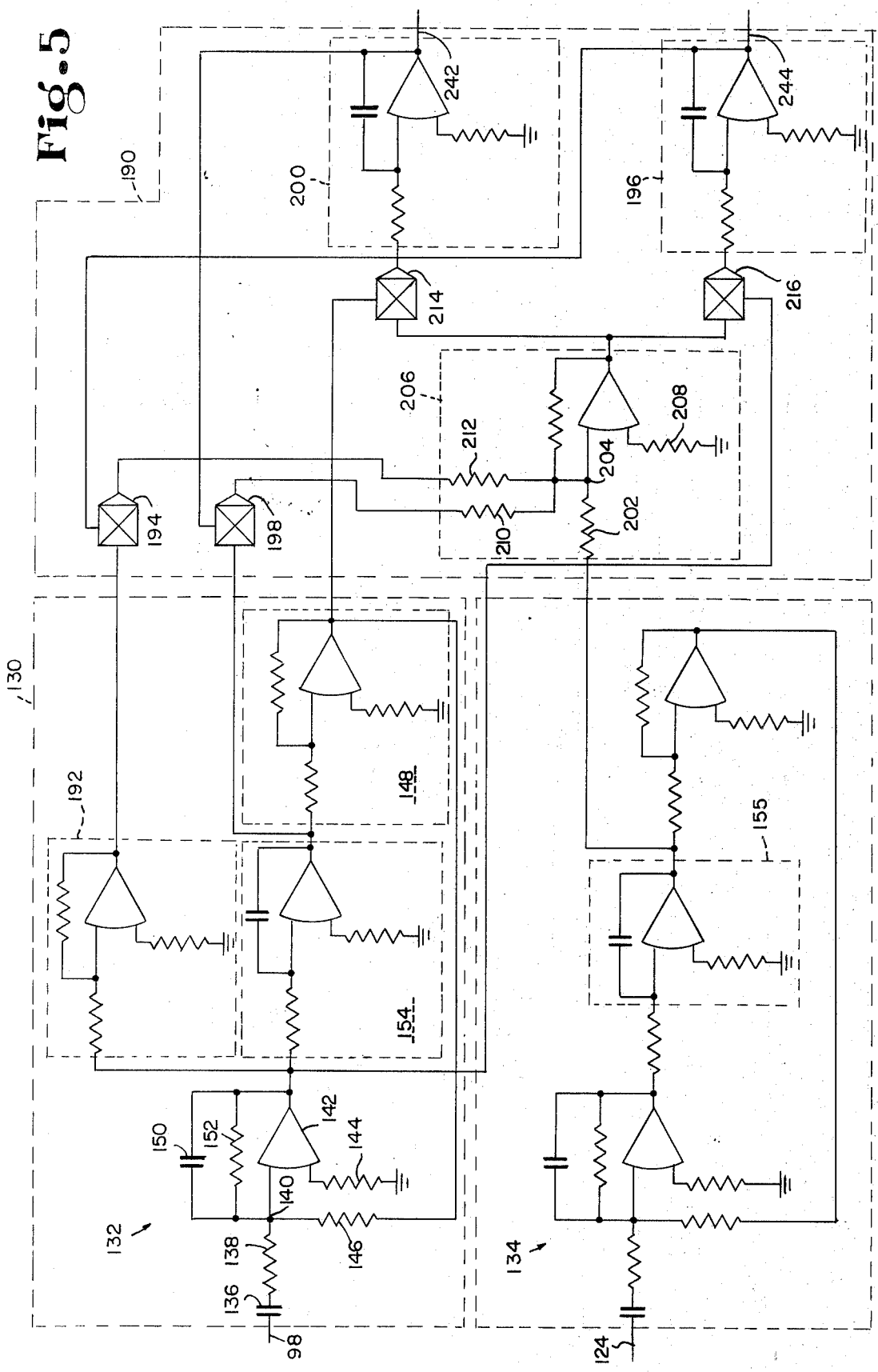
FIG. 5 is an electrical circuit diagram showing a computation circuit embodied in the invention.

The circuit 190 shown at the right in FIG. 5 is for the analog solution of these latter two equations. Since such computation is performed over several cycles of the applied sinusoidal force, the net effect is to arrive at optimal values for K and C.

More specifically and with reference to FIG. 5, the signal $-V_D$, available at the output of the inverting amplifier 192, is applied to the input of an analog multiplier 194 in the calculation circuit 190. The other input to this multiplier 194 is from the output of an integrator 196 which integrates the signal representative of $-dC$, which will be shown to be present at its input, to form the signal C which is applied to the multiplier 194. The output of the multiplier 194 is the signal representative of the quantity $-CV_D$.

The negative of the new deflection signal, i.e., $-D'$, is used as one input of a second multiplier 198 in the calculation circuit 190. The other input to this multiplier 198 is obtained from the output of an integrator 200 which integrates a signal applied to its input which will be shown to be $-dK/dt$, to place a signal equal to K on its output. The multiplication of these two signals, $-D'$ and K, by the multiplier 198 makes a signal available on its output which is equal to $-KD'$.

The new force signal, $F'$, is applied through an input resistor 202 to the summing junction 204 of the inverting input of a summing amplifier 206. The non-inverting input to this amplifier 206 is connected to ground through resistor 208. The outputs of the previously mentioned multipliers 194 and 198 are also applied through respective input resistors 210 and 212 to this same summing junction 204.

The output of the summing amplifier 206 equals the negative of the sum of the inputs, i.e., $-(F' - KD' - CV_D)$. This output is then applied as an input to two multipliers 214 and 216. The other input to the first of these multipliers 214 is from the inverter 148 in the velocity and deflection generation circuit 132 whose output represents $D'$. The product of the two signals applied to the first amplifier 214 is equal to $-(F' - KD' - CV_D) D'$. It can now be seen that, with the exception of the negative sign, this expression is equal to $dK/dt$. The output of the multiplier 214 is used as the input to the previously mentioned integrator 200 which integrates the input with an accompanying sign inversion to yield K.

In a similar manner, the output of the summer 206 is multiplied in the second multiplier 216 by the quantity $V_D$ which, at the output of the multiplier 216, yields $-(F' - KD' - CV_D) V_D$. It is also apparent from the aforementioned relationships, that this quantity, with the exception of the negative sign, is equal to $dC/dt$, which when applied as the input to the appropriate integrator 196 yields the quantity C.

The generated signals for K and C are, by means of respective output conductors 242 and 244, coupled to the amplitude scaling network shown in FIG. 4 for proper amplitude scaling in accordance with the initial force range selected and the particular engineering units desired. The K signal output conductor 242 is connected directly to one terminal in the second wafer or level 126 of the single ganged wafer rotary switch 104 previously adjusted in connection with the scaling of the force signal. Appropriately reduced amplitude of K is connected to the remaining terminals in the second wafer 126 from the common junctions between four scaling resistors 248 through 251. The wiper arm 246 in this second wafer 126 is connected to, and rotates in fixed relationship with, the first wafer wiper arm 120 so that when the particular force scale is chosen by moving the first wafer wiper arm 120, the second wafer wiper arm 246 moves to a corresponding terminal in the second wafer 126.

In a similar manner, the C signal output conductor 244 is connected to one terminal in the third terminal or level 127 in the same rotary switch 104. The common connections between four serially connected resistors 256 through 259 are connected to the remaining three terminals in this wafer 127. The wiper arm 254 of this wafer 127 also is connected to the first and second wiper arms 120 and 206 and rotates in correspondence therewith. The values of K and C are supplied to the display module, which can be a digital voltmeter or any other appropriate display device, by an output conductor 223 which is connected to a selector switch 222 which can be manually adjusted to provide the value desired for display.

Figure 8:
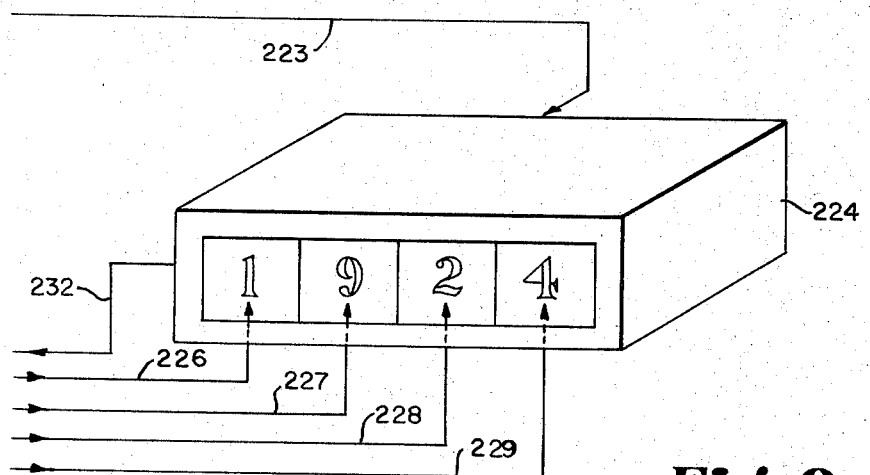
FIG. 8 shows a display module for use with the invention.

A fourth wafer 128 in this switch 104 is used for the designation of a decimal point in the K and C values displayed on a display module 224 shown in FIG. 8. The four terminals 226 through 229 of this wafer 128 are connected to four successive decimal point positions on the display module 224. The wiper arm 234 of this wafer 128 rotates in correspondence with the other three wiper arms 214, 206 and 120 to appropriately place the decimal point in the displayed values. The illuminating voltage for the decimal point indicators comes from a supply conductor 232 in the display module 224 and is connected to the wiper arm 234 in the decimal point wafer 128. When a K value is being displayed, the decimal point is understood to represent a comma.

While we have shown an apparatus and method for identifying the coefficients of terms used in a linear model, it is to be understood that the scope of the invention encompasses an apparatus and method for identifying the coefficients of a mathematical model wherein non-linear terms are used to describe the material or substance under analysis. For example, a non-linear spring effect could be included in the mathematical model for a rubber specimen. This would result in a non-linear term, i.e., $K' D^3$, being added to the linear model. The generation of the signal representative of $D^3$ can be obtained using analog multipliers as shown in FIG. 5. The steepest descent method could then be applied to the model equation containing the new term of $K'D^3$ for computation of the three coefficients, C, K, and $K'$ in the manner already described.

Furthermore the scope of the invention encompasses the use of any order of differential equation to represent a material or substance. The test signal or excitation is appropriately chosen with respect to the number of parameters or coefficients to be computed. For example, instead of using a sinusoidal excitation as used in the preferred embodiment, a transient test, a combination of several sinusoidal excitations or even different amplitudes of periodic signals can be used. In the case of the transient response, for example, the excitation is measured along with the response. Furthermore, a rate of response can be measured due to the transient signal.

In any event, our computation method and apparatus, together with our circuit matching method and apparatus, can be used to precisely compute the dynamic properties of any material or substance as long as an excitation applied to the material or substance and the response resulting therefrom is measurable and is transferable into electrical signals.

We claim:

1. An apparatus for the computation of the value of a parameter which characterizes a dynamic property of a substance, which comprises means for applying an excitation to the substance, first transducing means for measuring said excitation and for generating a first electrical excitation signal representative of said excitation; second transducing means for measuring a response of the substance to said excitation signal and for generating a first electrical response signal representative of said substance response; first generation means coupled to said second transducing means for generating a rate of response electrical signal and a second electrical response signal from said rate of response signal; second generation means coupled to said first transducing means for generating a second excitation signal, said first and second generation means having identical phase and gain characteristics so that the phase and amplitude relationship between said rate of response signal, said second response signal and said second excitation signal is identical to the phase and amplitude relationship between the applied excitation, the response of the substance and the rate of response of the substance; and computation means for computing a value of the parameter using said rate of response, said second response signal and said second excitation signal.

2. An apparatus for the computation of the value of a parameter which characterizes a dynamic property of a substance as claimed in claim 1 including means for selectively scaling one of said generated electrical signals and for simultaneously scaling the computed value of the parameter.

3. An apparatus for the computation of the values for parameters which characterize the dynamic properties of a substance when an excitation is applied thereto, which comprises first transducer means for measuring the excitation and generating a first electrical excitation signal representative thereof; second transducer means for measuring a response of the substance to the excitation and for generating a first electrical response signal representative thereof; first compensation means for adjusting said first excitation signal to create a first adjusted excitation signal; second compensation means for adjusting said first response signal to create a first adjusted response signal; first generation means for generating a rate of response signal and a second electrical response signal from said first adjusted response signal, said rate of response signal being an exact time derivative of said second electrical response signal; second generation means for generating a second electrical excitation signal from said first adjusted excitation signal whereby the phase and amplitude relationship between said second electrical response signal and said second electrical excitation signal is identical to the phase and amplitude relationship between said first adjusted response signal and said first adjusted excitation signal; and analog circuit means for using said second excitation signal, said second response signal and said rate signal to compute the parameters which characterize the dynamic properties of the substance.

4. An apparatus for the computation of the values for parameters which characterize the dynamic properties of a substance as claimed in claim 3 wherein said first generation means and said second generation means are exactly matched in gain and phase characteristics whereby signals applied to each of said generation means are changed thereby by exactly the same amount of amplitude and exactly the same amount of phase shift.

5. An apparatus for the computation of the values for parameters which characterize the dynamic properties of a substance when an excitation is applied thereto, which comprises first transducer means for measuring the excitation and generating a first electrical excitation signal representative thereof; second transducer means for measuring the rate of a response of the substance to the excitation and for generating a first electrical rate of response signal representative thereof; first compensation means for adjusting said first excitation signal to create a first adjusted excitation signal; second compensation means for adjusting said first rate of response signal to create a first adjusted rate of response signal; first generation means for generating a response signal and a second rate of response signal from said first adjusted rate of response signal, said response signal being the exact time integral of said second rate of response signal; second generation means for generating a second electrical excitation signal from said first adjusted excitation signal whereby the phase and amplitude relationship between said second electrical rate of response signal and said second electrical excitation signal is identical to the phase and amplitude relationship between said first adjusted rate of response signal and said first adjusted excitation signal; and analog circuit means for using said second excitation signal, said second rate of response signal and said response signal to compute the parameters which characterize the dynamic properties of the substance.

6. An apparatus for the computation of the values for parameters which characterize the dynamic properties of a substance as claimed in claim 5, including display means for presenting the computed values of the parameters whereby the computed values are presented in engineering units.

7. An apparatus for the computation of the dynamic spring rate and the damping coefficient of an object, which comprises means for applying a force to the object; first transducer means for measuring said force and for generating an electrical force signal proportional thereto; second transducer means for measuring the deflection of said object resulting from said force and for generating an electrical deflection signal proportional thereto; first phase compensation means for adjusting the phase of said force signal in accordance with the phase of said force; second phase compensation means for adjusting the phase of said deflection signal in accordance with the phase of said deflection whereby the difference in phase between the adjusted force signal and the adjusted deflection signal is identical to the difference in phase between said force and said deflection; first generator means coupled to said phase compensation means for generating a rate of deflection signal and a second deflection signal from said compensated deflection signal, said rate of deflection signal being an exact time derivative of said second deflection signal; second generator means coupled to said first compensation means for generating a second force signal from said compensated force signal; adjustment means coupled to said first and second generator means for exactly matching the overall phase and gain characteristics of said first generator means and said second generator means; and computation means coupled to the outputs of said first and second generator means for computing the dynamic spring rate and the damping coefficient of the object.

8. The apparatus for the computation of the dynamic spring rate and the damping coefficient of an object as claimed in claim 7 wherein said computation means is an analog circuit.

9. The apparatus for the computation of the dynamic spring rate and the damping coefficient of an object as claimed in claim 7 including a scaling circuit coupled to said first phase compensation means and to said computation means for simultaneously scaling said adjusted force signal, the computed dynamic spring rate and the computed damping coefficient.

10. A method for automatically computing the values for dynamic properties of a substance, which comprises the steps of applying an excitation to the substance; measuring said excitation and generating a first electrical excitation signal proportional thereto; measuring a response of the substance to said excitation and generating a first electrical response signal proportional thereto; adjusting the difference in phase between said first excitation signal and said first response signal to equal the difference in phase between said excitation and said response; generating a rate signal from said response signal; generating a second response signal from said rate signal; generating a second excitation signal from said first excitation signal; representing the substance with a mathematical model wherein the coefficient of one term in said model represents the value of the dynamic property being computed; and using said mathematical model, said rate signal, said second response signal and said second excitation signal to compute the value of the dynamic property.

11. The method for automatically computing the value for dynamic properties of a substance as claimed in claim 10 including the step of scaling one of said first excitation and said first response signals.

12. The method for automatically computing the value for dynamic properties of a substance as claimed in claim 11 including the step of displaying the computed dynamic property value.

13. A method for automatically computing the values for dynamic properties of a substance, which comprises the steps of applying an excitation to the substance; measuring said excitation and generating a first electrical excitation signal proportional thereto; measuring the rate of the response of the substance to said excitation and generating a first electrical rate of response signal proportional thereto; adjusting the difference in phase between said first excitation signal and said first rate of response signal to equal the difference in phase between said excitation and said rate of response; generating a response signal from said rate of response signal; generating a second rate of response signal from said response signal; generating a second excitation signal from said first excitation signal; representing the substance with a mathematical model wherein the coefficient of one term in said model represents the value of the dynamic property being computed using said mathematical model, said second rate of response signal, said response signal and said second excitation signal to compute the value of the dynamic property.

* * * * *

UNITED STATES PATENT OFFICE
CERTIFICATE OF CORRECTION

Patent No. 3,836,757                    Dated September 17, 1974

Inventor(s) Chester L. Nachtigal, Benny M. Hillberry, Robert G. Leonard, and Raymond E. Goodson It is certified that error appears in the above-identified patent and that said Letters Patent are hereby corrected as shown below:

(1) "Robert G. Leonard" should be added to the list of inventors.

(2) The following two paragraphs should be added at the end of the abstract:

--In the alternative, the second transducer can be used to generate an electrical signal which is representative of the rate of change of the response of the material to the excitation. In this instance, the first output of the first generating circuit is a signal closely related to the compensated rate of response signal and the second output is representative of the response itself.

The method of steepest descent is utilized using the generated signals related to the excitation, the response, and the rate of change of the response, and a mathematical model of the material under analysis to automatically compute values for the characteristic dynamic properties of the material. The computed values can be displayed in predetermined engineering units on digital display means.--

(3) In Column 13, line 59, "thereby" should be changed to --therein--.

(4) In Column 10, line 47, "$(F' - KD' - CV_D')$" should be changed to --$(F' - KD' - CV_D')^2$--.

(5) In Column 10, line 65, "-dC" should be changed to -- $\frac{-dC}{dt}$ --.

Signed and sealed this 14th day of January 1975.

SEAL)
Attest:

McCOY M. GIBSON JR.
Attesting Officer

C. MARSHALL DANN
Commissioner of Patents